UNITED STATES PATENT OFFICE.

SCOTT K. WILSON, OF GRAND RAPIDS, MICHIGAN.

PROCESS OF MAKING EXCELSIOR FROM BROOM-CORN CLIPPINGS.

No. 823,573. Specification of Letters Patent. Patented June 19, 1906.

Application filed February 17, 1906. Serial No. 301,602.

*To all whom it may concern:*

Be it known that I, SCOTT K. WILSON, a citizen of the United States, residing at Grand Rapids, in the county of Kent and State of Michigan, have invented certain new and useful Improvements in Processes of Making Excelsior from Broom-Corn Clippings; and I do hereby declare the following to be a full, clear, and exact description of the invention, such as will enable others skilled in the art to which it appertains to make and use the same.

This invention relates to a process of converting broom-corn clippings into excelsior suitable for use as a filling for mattresses and the like, and has for its object to enable brittle broom-corn clippings, which now are a practically waste product of broom-factories, to be converted into a mat, or cushion of tough flexible fibrous material having the general properties of wood excelsior, but being much more elastic, tougher, and less liable to break or crumble when put to the uses for which mattresses are usually employed.

The process of manufacturing excelsior in this manner is as follows: I first clean the broom-corn clippings thoroughly in water. I then immerse the material in a solution made as follows: In eight gallons of water dissolve two pounds of caustic soda. Mascerate the material in the solution for twenty-four hours and then run off the liquor, after which wash the product two or three times in clean water. The material is then spread to dry either in the sunlight or by applying artificial heat. The drying should be done slowly.

This process produces a clean tough excelsior-like material, which answers all requirements of the purposes to which it is adapted, as above set forth.

What I claim as my invention, and desire to secure by Letters Patent, is as follows:

The process of converting broom-corn clippings into an excelsior-like substance suitable for use as a filling for mattresses and the like, consisting in first washing the broom-corn clippings in water, then mascerating the material for approximately twenty-four hours in a solution of caustic soda and water, then washing thoroughly and slowly drying the resulting product by application of mild heat, substantially as herein described.

In testimony whereof I affix my signature in presence of two witnesses.

SCOTT K. WILSON.

Witnesses:
CLYDE I. HOLMES,
OLIVE SMITH.